S. L. STRATTON.
SPIRIT LEVEL.
APPLICATION FILED OCT. 14, 1909.
963,959.
Patented July 12, 1910.
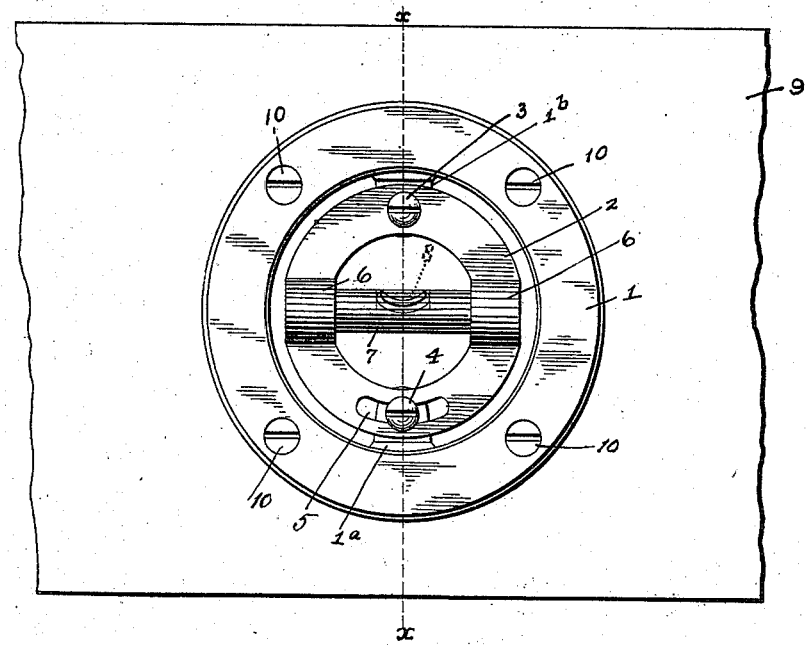
Fig. 1
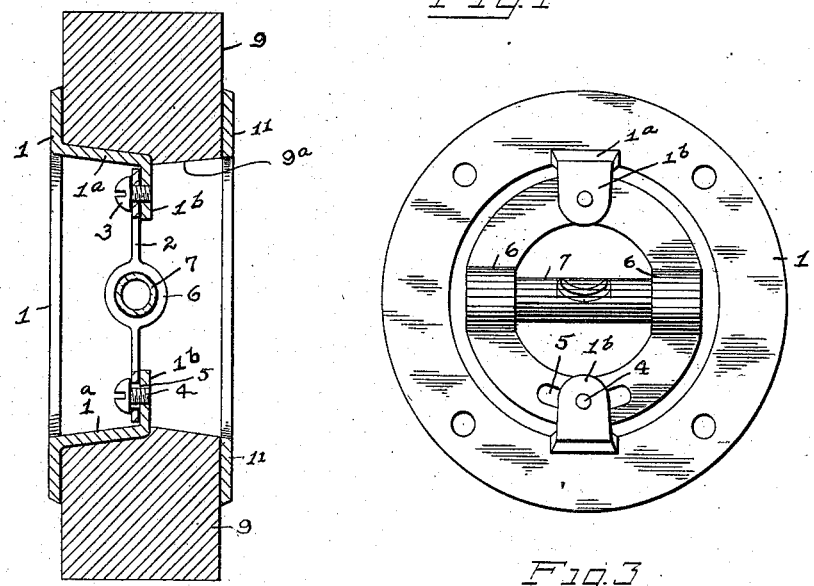
Fig. 2
Fig. 3
Witnesses
E. B. Maurer.
A. L. Phelps.
Inventor
Samuel L. Stratton
By C. C. Shepherd
Attorney
THE NORRIS PETERS CO., WASHINGTON, D. C.

UNITED STATES PATENT OFFICE.

SAMUEL L. STRATTON, OF COLUMBUS, OHIO.

SPIRIT-LEVEL.

963,959.  Specification of Letters Patent.  Patented July 12, 1910.

Application filed October 14, 1909. Serial No. 522,545.

*To all whom it may concern:*

Be it known that I, SAMUEL L. STRATTON, a citizen of the United States, residing at Columbus, in the county of Franklin and State of Ohio, have invented certain new and useful Improvements in Spirit-Levels, of which the following is a specification.

My invention relates to the improvement of spirit levels of that class in which a spirit level carrier is adapted to be supported in an opening formed through a level stock or bar.

The objects of my invention are to provide a level of this class with improved means for adjusting the carrier for the purpose of indicating angles or inclinations from a horizontal or vertical line; to provide a simple, inexpensive and neat metallic frame construction for the support of the carrier and to produce other improvements the details of which will be more fully pointed out hereinafter. These objects I accomplish in the manner illustrated in the accompanying drawing, in which—

Figure 1 is a face view of a portion of a level stock having my improved spirit level connected therewith, Fig. 2 is a transverse section on line $x$—$x$ of Fig. 1, and, Fig. 3 is a view of my improved spirit level taken from the opposite side from that shown in Fig. 1.

Similar numerals refer to similar parts throughout the several views.

In carrying out my invention, I employ a supporting ring plate or body 1, which has formed therewith on its rear or inner side adjacent to its inner edge, two opposing rearwardly extending bracket arms $1^a$, each of the latter being formed angular or having an inturned terminal portion $1^b$.

2 represents a flat spirit level carrying ring, which is of slightly less diameter than the diameter of the opening of the ring plate 1, said carrier ring being secured in connection with and supported by the inturned members $1^b$ of the bracket arms or lugs $1^a$. One of these connections of the ring 2 and one of the members $1^b$ is effected through the medium of an ordinary screw such as is indicated at 3, while the opposite connection is formed by passing a screw 4 through a curved slotted opening or mortise 5 in the carrier ring 2. In constructing the carrier ring 2, I form the same at opposite points which are intermediate of the screws 4 and 3, with rounded bearing or socket projections 6 in which are fitted respectively the ends of a glass spirit level tube 7, the latter having the usual air bubble 8.

In connecting my improved level carrying frame with a level stock or bar such as is indicated at 9, I form through said stock a suitable sized opening $9^a$ into which from one side of the stock, are inserted the members $1^a$ and 2, the flat ring plate 1 being thus made to abut against the face of the level stock about the opening $9^a$ thereof, in which position said ring is secured by screws 10 which pass through holes formed at desirable intervals in the ring. In the manner above described, the spirit level tube is supported centrally within the opening $9^a$ of the stock, and in order to provide a uniform appearance on both sides of the stock, I provide about the opening $9^a$ on that side of the level which is opposite the plate ring 1, a plate ring 11 which corresponds with the body of the ring 1.

It is obvious that when the screw 4 is turned inward until its head binds firmly against the inner plate ring 2, said plate ring will be held against swinging rotary movement, but when it is desired to utilize my improved level for indicating or determining a predetermined inclination or angle, it is obvious that the screw may be loosened and the ring 2 swung on its pivot screw 3 to the position which will insure the location of the spirit level bubble at the center of the length of the tube when the stock is at the inclination or angle required.

It will be observed that in the construction of my device, I have employed comparatively few parts and that the spirit level carrier is directly supported by the main frame member 1.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is—

1. In a device of the character described, the combination with a frame ring having rearwardly extending arms on its inner side, of a carrier ring of less diameter than said frame ring, said carrier ring having a pivotal connection with one of said frame ring arms and having a curved slotted opening, a screw passing through said slotted opening and engaging a threaded opening which is provided in the remaining frame ring arm, a spirit level tube mounted diametrically in said carrier ring, and means for securing said frame ring to the face of a level stock.

2. In a device of the character described, the combination with a level stock having an opening therethrough, a frame ring having opposing angular arms projecting from its rear side, and means for securing said frame ring to the face of said level stock about the opening therein, of a carrier ring having a pivotal connection with one of said frame ring arms and having a curved slotted opening, a screw passing through said slotted opening and adjustably engaging the remaining frame ring arm, a spirit level tube supported diametrically in said carrier ring, and a ring adapted to be secured about the stock opening on the opposite side thereof from the first mentioned frame ring.

In testimony whereof I affix my signature in presence of two witnesses.

SAMUEL L. STRATTON.

Witnesses:
C. C. SHEPHERD,
E. V. GRISWOLD.